(12) United States Patent
Kim

(10) Patent No.: US 8,043,737 B2
(45) Date of Patent: Oct. 25, 2011

(54) SECONDARY BATTERY AND METHOD WITH ELECTRODE TAP POSITIONED AT SHORT SIDE PORTION OF SECONDARY BATTERY CAN

(75) Inventor: Jun Ho Kim, Cheonan-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 859 days.

(21) Appl. No.: 10/921,202

(22) Filed: Aug. 19, 2004

(65) Prior Publication Data

US 2005/0042507 A1    Feb. 24, 2005

(30) Foreign Application Priority Data

Aug. 22, 2003 (KR) .......................... 10-2003-0058405

(51) Int. Cl.
*H01M 4/00* (2006.01)
*H01M 4/64* (2006.01)

(52) U.S. Cl. .......... 429/94; 429/211; 429/233; 429/186; 429/178

(58) Field of Classification Search ...................... 429/94, 429/161, 176, 186, 178, 211, 233, 247
See application file for complete search history.

(56) References Cited

U.S. PATENT DOCUMENTS

2004/0247998 A1 * 12/2004 Nakanishi et al. ............ 429/161

FOREIGN PATENT DOCUMENTS

| JP | 10-214612 | 8/1998 |
|---|---|---|
| JP | 2000-285897 | 10/2000 |
| JP | 2001-210285 | 8/2001 |
| JP | 2001-325938 | 11/2001 |
| JP | 2002-305033 | 10/2002 |
| JP | 2003-178745 | 6/2003 |
| KR | 10-0303828 | 10/2001 |

OTHER PUBLICATIONS

Chinese Examination Report issued on Jan. 19, 2007 by the Chinese Patent Office for Chinese Patent Application No. 200410056954.0.

* cited by examiner

*Primary Examiner* — Raymond Alejandro
(74) *Attorney, Agent, or Firm* — Christie, Parker & Hale, LLP

(57) ABSTRACT

A secondary battery and method, with the secondary battery including a can having a polygonal section, and with the can having an opening portion of which one end is opened, and having a short side portion and a long side portion. The secondary battery includes an electrode assembly constructed by stacking a negative electrode plate, a separator and a positive electrode plate, with the electrode assembly being wound up in a jelly roll shape, pressed in a predetermined direction, and received in the can. The secondary battery further includes at least one electrode tap connected to a corresponding electrode plate of the electrode assembly and protruded toward an opening portion of the can from an outer circumferential portion of the electrode assembly, at the short side portion of the can.

9 Claims, 2 Drawing Sheets

SECONDARY BATTERY AND METHOD WITH ELECTRODE TAP POSITIONED AT SHORT SIDE PORTION OF SECONDARY BATTERY CAN

CROSS-REFERENCE TO RELATED APPLICATIONS

This application claims the priority benefit of Korean Patent Application No. 2003-58405, filed on Aug. 22, 2003, in the Korean Intellectual Property Office, the disclosure of which is incorporated herein in its entirety by reference.

BACKGROUND OF THE INVENTION

1. Field of the Invention

The present invention relates to a secondary battery, and more specifically, to a secondary battery with a relative position between an electrode tap positioned at an outer circumferential portion of an electrode assembly formed as a jelly roll and a can receiving the electrode assembly jelly roll.

2. Description of the Related Art

A secondary battery is formed by receiving an electrode assembly in a can made of aluminum or aluminum alloy, for example, injecting an electrolyte into the can, and then hermetically sealing the can. In the secondary battery, the electrode assembly includes a positive electrode plate, a separator, and a negative electrode plate. An electrode terminal electrically separated from the can is provided at a top of the battery, so the electrode terminal can function as a positive electrode or a negative electrode of the battery. At that time, the can itself can function as a negative electrode, when the electrode terminal functions as the positive electrode, and function as a positive electrode when the electrode terminal functions as the negative electrode.

The hermetically sealed battery is provided along with safety devices such as a Positive Temperature Coefficient (PTC) element, a thermal fuse, a protective circuit board, e.g., a protecting circuit module (PCM), etc. These safety devices are electrically connected to the positive and negative electrodes of the battery and intercept a current when a voltage of the battery is rapidly raised due to an increase in temperature or excessive charge and discharge of the battery, thereby preventing the battery from being destroyed, for example. The battery provided with the safety devices is typically placed in a packing case to form a battery pack.

FIG. 1 is a partial perspective view illustrating a conventional secondary battery with an electrode tap positioned at a long side portion of the can. The open end of the can 11 is provided with an opening portion 11a, with the electrode assembly 12 being placed in the can 11 through the opening portion 11a, as illustrated in FIG. 1. The electrode assembly 12 is wound up in a jelly roll shape, after the positive electrode plate and the negative electrode plate are stacked therein, along with the separator therebetween. An electrode tap 14 and electrode tap 13, respectively, electrically connected to one of the positive electrode plate and the negative electrode plate, are drawn out from a top of the electrode assembly 12. The electrode tap 13 may be a negative electrode tap and electrode tap 14 may be a positive electrode tap, or electrode tap 13 may be the positive electrode tap and electrode tap 14 may be the negative electrode tap.

The can 11 has substantially a rectangular parallelepiped shape, and is made of metal material, so that the can 11 can function as a terminal.

When the electrode tap (positive or negative electrode tap), coupled to a half or more of a width of the electrode assembly, is positioned at an outer circumferential portion of the electrode assembly jelly roll, the following problems have been noticed. First, even before using the battery, a pressure is applied between the can 11 and a portion of the electrode assembly 12, in the area of the electrode tap 14, due to the close arrangement between the electrode assembly 12 and the can 11, such that the operational ability of the electrode assembly 12 deteriorates.

Further, during use of the battery, the battery cycles between volume expansion and volume contraction, with these expansions and contractions allowing the electrode tap 14 to be pressed between the can 11 and a corresponding electrode plate (the positive electrode plate, the negative electrode plate, or the separator, depending on whether electrode tap 14 is the positive or negative electrode tap), thereby deforming the corresponding electrode plate along a shape of the electrode tap 14. During use of the battery, the deformed portion of the corresponding electrode plate changes to a non-reaction portion due to the pressing, with lithium ions agglomerating around the deformed portion or the peripheries thereof, thereby causing problems such as dendritic deformations, increasing in thickness, etc. These are serious problems when they occur in a high-capacity battery having such a polygonal section.

SUMMARY OF THE INVENTION

Accordingly, it is an aspect and/or advantage of the present invention to solve the above and/or other problems. It is thus a further aspect and/or advantage of the present invention to prevent an electrode plate of an electrode assembly from being pressed by a positive electrode tap or a negative electrode tap adjacent to a can after the electrode assembly has been wound.

Additional aspects and/or advantages of the invention will be set forth in part in the description which follows and, in part, will be obvious from the description, or may be learned by practice of the invention.

To accomplish the above and/or other aspects and advantages, embodiments of the present invention include a secondary battery, including a can having a polygonal section, with the can having an opening portion, a short side portion, and a long side portion, an electrode assembly constructed by stacking a negative electrode plate, a separator, and a positive electrode plate, the electrode assembly being wound up in a jelly roll shape, being pressed in a predetermined direction, and being received in the can, and at least one electrode tap connected to a corresponding electrode plate of the electrode assembly and protruded toward the opening portion of the can from an outer circumferential portion of the electrode assembly along the short side portion of the can.

The secondary battery may include a negative electrode tap connected to the negative electrode plate and protruded toward the opening portion of the can from a central portion of the electrode assembly, and the one electrode tap, being a positive electrode tap, connected to the positive electrode plate and protruded toward the opening portion of the can from the outer circumferential portion of the electrode assembly along the short side portion of the can.

Further, the one electrode tap may be positioned at the short side portion of the can such that a portion overlapping a width of the short side portion of the can is maximized.

To accomplish the above and/or other aspects and advantages, embodiments of the present invention include a method of making a secondary battery, including connecting at least one electrode tap to a corresponding negative or positive electrode plate of an electrode assembly and protruding the one electrode tap toward an opening portion of the can from an outer circumferential portion of the electrode assembly along a short side portion of the can, with the can having a polygonal section, the opening portion, the short side portion, and a long side portion, stacking the negative electrode plate, a separator, and the positive electrode plate in an electrode assembly, and winding the electrode assembly up in a jelly roll shape and placing the wound electrode assembly in the can.

The method may further include positioning the one electrode tap at the short side portion of the can such that a portion overlapping a width of the short side portion of the can is maximized.

Further, the method may include connecting a negative electrode tap to the negative electrode plate and protruding the negative electrode tap toward the opening portion of the can from a central portion of the electrode assembly, and connecting the one electrode tap, which is a positive electrode tap, to the positive electrode plate and protruding the one electric tap toward the opening portion of the can from the outer circumferential portion of the electrode assembly along the short side portion of the can.

To accomplish the above and/or still other aspects and advantages, embodiments of the present invention include a secondary battery method, for at least intercepting a current when a voltage of a system is rapidly raised due to increase in temperature or excessive charge and discharge of the system, thereby preventing the system from being harmed, comprising implementing the system with any of the secondary battery embodiments of the present invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
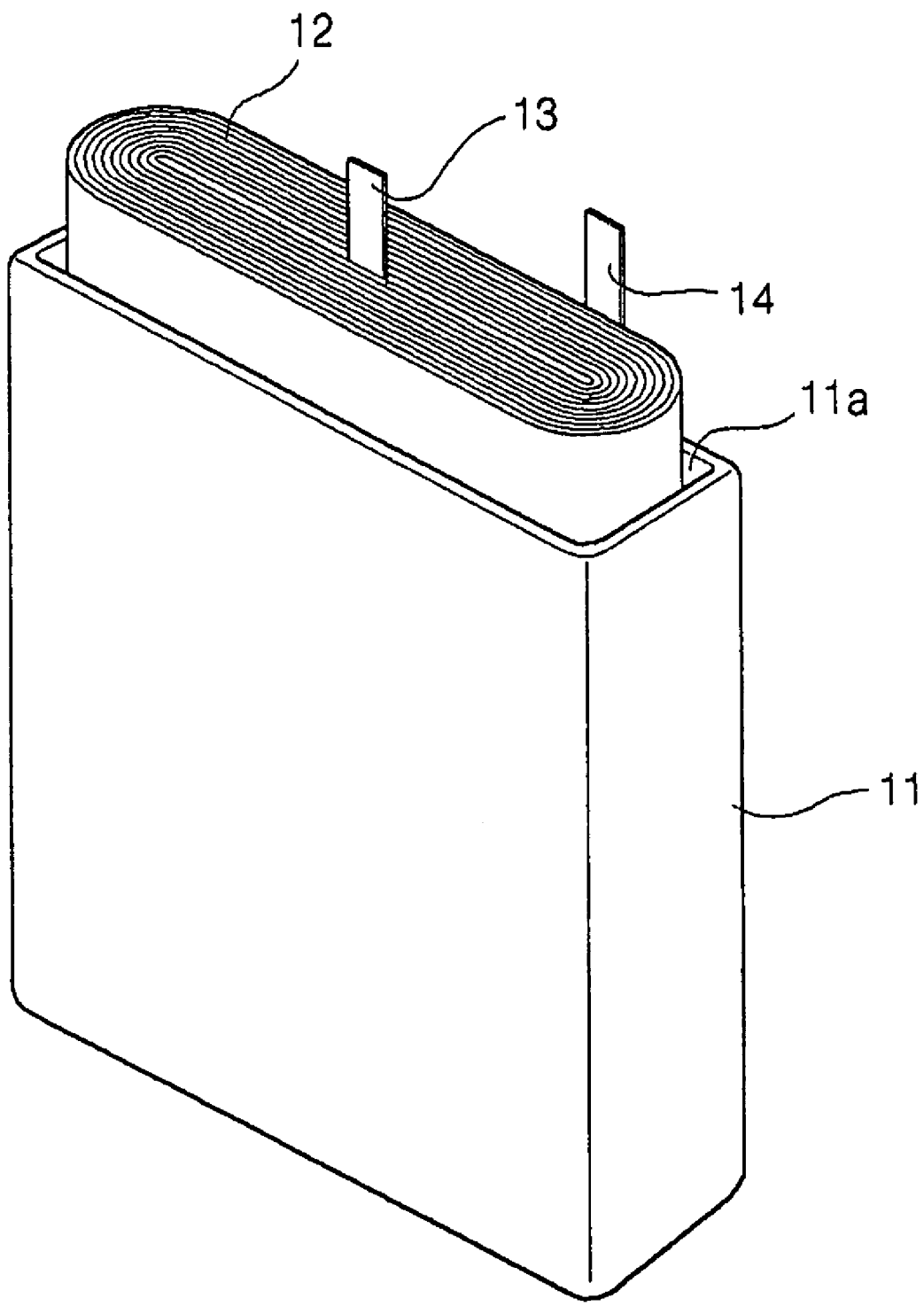
FIG. 1 is a partial perspective view illustrating a conventional secondary battery with an electrode tap positioned at a long side portion of a can.

Reference will now be made in detail to the embodiments of the present invention, examples of which are illustrated in the accompanying drawings, wherein like reference numerals refer to the like elements throughout.

Figure 2:
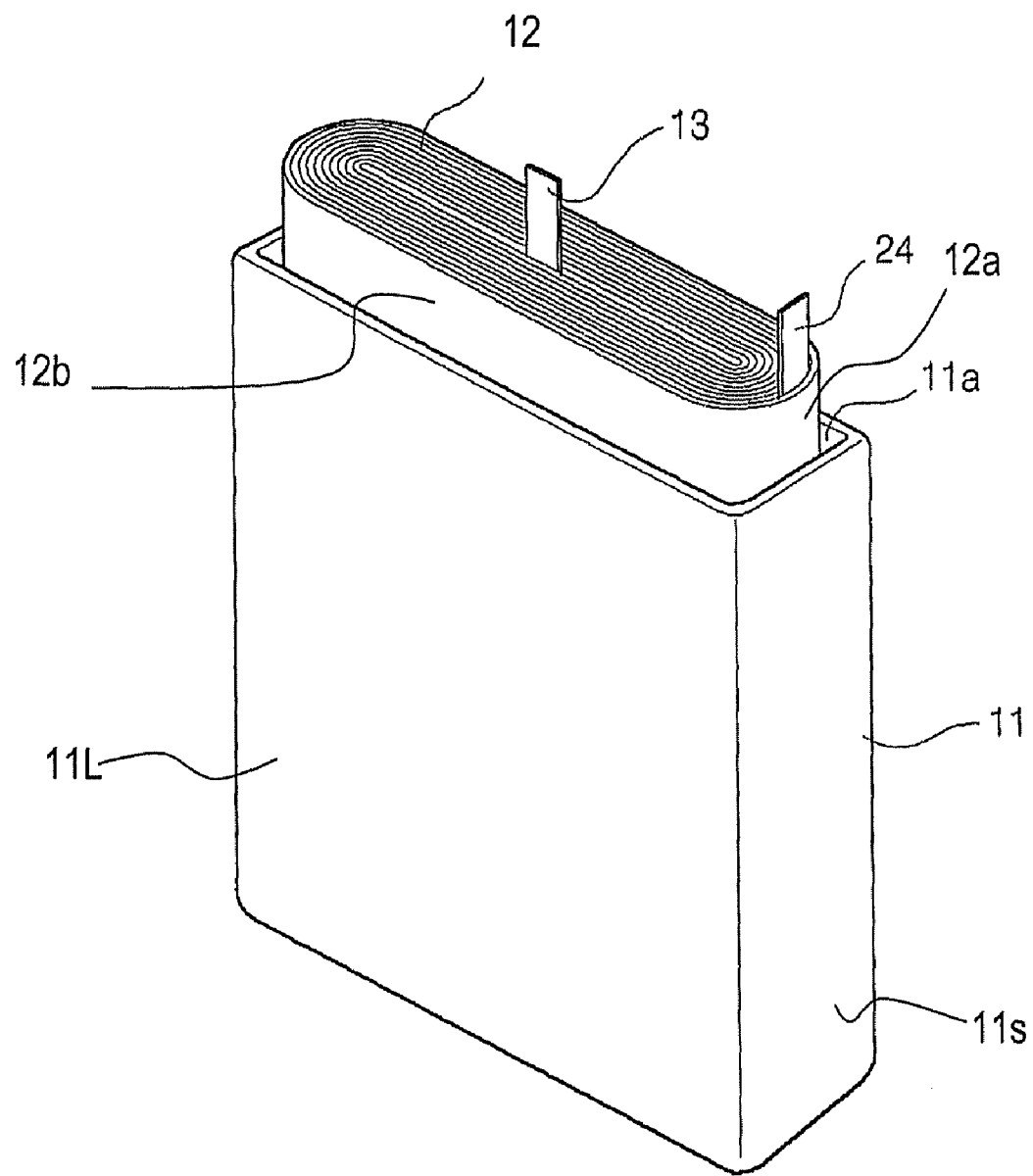
FIG. 2 is a partial perspective view illustrating an electrode assembly with an electrode tap positioned at a short side portion of a can, according to an embodiment of the present invention.

FIG. 2 is a partial perspective view illustrating an electrode assembly with an electrode tap positioned at a short side portion of a can of a secondary battery. The secondary battery, having the tap-electrode assembly coupled structure according to embodiments of the present invention, includes at least a can 11, a can opening portion 11a, an electrode assembly 12, an electrode tap 13 and corresponding electrode plate, and an electrode tap 24 and corresponding electrode plate, and a separator therebetween.

The can 11 has substantially a rectangular parallelepiped shape, is made of metal material, and has a short side portion that includes opposing side walls, and a long side portion that includes opposing main walls that have a larger surface area than the side walls. The can 11 itself can function as a terminal. The can 11 is usually made of aluminum or aluminum alloy, which is a light conductive metal. The opening portion 11a is formed at one end of the can 11, and the electrode assembly 12 is received in the can 11, through the opening portion 11a.

The electrode assembly 12 has a jelly roll shape obtained by stacking a negative electrode plate and a positive electrode plate with the separator therebetween and then winding them up. The electrode assembly 12 can also be pressed in a particular direction. Accordingly, the electrode assembly 12 has a folded portion 12a and a flat portion 12b. The folded portion 12a of the electrode assembly 12 corresponds to the short side portion 11S of the can 11 and the flat portion 12b of the electrode assembly 12 corresponds to the long side portion 11L of the can 11.

Electrode taps may accomplish their electrical connection by being welded to, or by coming in contact with, for example, a body of the can 11 to function as an electrode in the battery in a bare cell state, or be welded to, or come into contact with, a cap plate closing an opening portion of the can 11. Further, for the purpose of the electrical connection, the electrode tap could be bent toward the outer circumferential portion or extend vertically and upwardly, for example.

The negative electrode plate employs a negative electrode collector that is a thin metal plate of a strip shape. In an embodiment of the present invention, the negative electrode collector may be a thin copper plate. A negative electrode coating portion coated with a negative electrode mixture, including negative electrode active material, is formed on at least one surface of the negative electrode collector. The negative electrode mixture may be formed by adding binder, plasticizer, conductive material, etc., to carbon, as the negative electrode active material. In an embodiment of the present invention, the electrode tap 13 may be a negative electrode tap, having a predetermined width, and coupled to one end side of the corresponding negative electrode plate, and protruded outwardly.

In FIG. 2, the electrode tap 13 is positioned at the center of the electrode assembly jelly roll, formed by winding up the electrode assembly, with the electrode tap 13 protruded upwardly. Here, in the example of the electrode tap 13 being a negative electrode tap, the electrode tap 13 is usually made of nickel. In this case where the electrode tap 13 is positioned inside the electrode assembly jelly roll 12, an initial portion of the electrode assembly jelly roll 12 to be wound up into the jelly roll has a portion to which negative electrode active material is not applied, with the negative electrode tap being welded to that portion. Therefore, by using an area generated by the portion of the electrode assembly 12 to which the active material is not applied, the pressure on the active material due to the electrode tap 13 can be reduced. Since the electrode tap 13 should be connected to a different portion of the cap plate or an electrical terminal insulated from the can 11 at the center of the cap plate, positioning the electrode tap 13 at the center of the electrode assembly jelly roll is advantageous for facilitating the electrical connection such as welding to a corresponding electrical terminal. If a connection distance between the electrode tap 13 and the electrical terminal positioned at the center of the cap plate is shortened up to a straight distance, an undesired contact with an inner portion of the can 11 having a different polarity, for example, the positive electrode tap or the cap plate when electrode tap 13 is a negative electrode tap, can be reduced, thereby reducing to an inner short-circuit.

On the other hand, in a case where the electrode tap 13 is positioned along an outside of the electrode assembly jelly roll, the electrode tap 13 is coupled to a corresponding electrode plate such that the electrode tap 13 is positioned at the short side portion of the can 11 when receiving the electrode assembly 12 in the can 11. The widths of the short side portion of the can 11 and the electrode tap 13 are designed such that the width of the electrode tap 13 is smaller than that of the short side portion of the can 11. However, even when the width of the short side portion of the can 11 is smaller than the width of the electrode tap 13, if the size of the can 11 is decreased, the position of the electrode tap 13 can be set such that the area of the electrode tap 13 overlapping the short side portion of the can 11 is maximized.

The positive electrode plate employs a positive electrode collector that can be a thin metal strip shaped plate, e.g., a thin aluminum plate or an aluminum mesh. A positive electrode coating portion of at least one surface of the positive electrode collector is coated with a positive electrode mixture including positive electrode active material, where the positive electrode mixture is formed by adding a binder, plasticizer, conductive material, etc., to lithium-metal oxides. A corresponding positive electrode tap, e.g., electrode tap 24, has a predetermined width and is coupled to one end side of the positive electrode plate. The positive electrode tap is usually made of aluminum, and is coupled to the positive electrode plate by using ultrasonic welding. At that time, the tap is directly welded to a portion of the thin aluminum positive electrode collector plate in which the positive electrode mixture does not exist. In the FIG. 2 example, the electrode tap 24, being a positive electrode tap, can be positioned at the outer circumferential portion of the electrode assembly jelly roll, formed by winding up the electrode assembly. As shown, the electrode tap 24 is situated in the folded portion 12a of the electrode assembly 12.

In this example, the electrode tap 24 can be coupled to the positive electrode plate such that the electrode tap 24 is positioned at the short side portion of the can 11, from an outer circumferential pattern of the electrode assembly 12, when the electrode assembly 12 is received in the can 11. The widths of the short side portion of the can 11 and the electrode tap 24 are designed such that the width of the electrode tap 24 is smaller than the width of the short side portion of the can 11. However, even when the width of the short side portion of the can 11 is smaller than the width of the electrode tap 24, with a decrease in a size of the can 11, the position of the electrode tap 24 can be set such that the area of the electrode tap 24 overlapping the short side portion of the can 11 is maximized. For example, the electrode tap 24, being the positive electrode tap, for example, may be allowed to overlap the short side portion of the can 11 from one end of the short side portion, or overlap of the electrode tap 24 with the short side portion of the can 11 may be terminated at the other end of the short side portion. A central portion of the electrode tap 24 can be positioned at the center of the short side portion of the can 11, in consideration of dispersion. On the other hand, at least a half of the width of the electrode tap 24 is preferably positioned at the short side portion to obtain the aforementioned advantage.

Thus, the electrode tap 24 can be a positive electrode tap and positioned along the short side of the can 11 and welded to an outer side portion of the electrode assembly 12 where active material has not been applied, facing the can 11, with the electrode assembly being wound up on an aluminum strip-shape current collector, i.e., the corresponding positive electrode plate, for example.

As noted above, a separator is aligned between the positive and negative electrode plates. The separator may be made of polyethylene, polypropylene, or copolymer of polyethylene and polypropylene, and the separator has a width larger than the width of the positive or negative electrode plates.

Again, the electrode assembly 12 includes the negative electrode plate, the positive electrode plate and the separator wound up in a jelly roll shape, pressed in a predetermined direction, and shaped in a polygonal section. An adhesive tape is attached to a bottom of the shaped electrode assembly 12, and then the electrode assembly is received in the can 11.

At least embodiments where the negative electrode tap is positioned at the center of the electrode assembly and the positive electrode tap is positioned at the outer circumferential portion of the electrode assembly, and where the negative electrode tap is positioned at one side of the outer circumferential portion of the electrode assembly and the positive electrode tap is positioned at the other side of the outer circumferential portion of the electrode assembly have been described. In addition, both of the negative electrode tap and the positive electrode tap may be positioned to be adjacent each other at the same short side portion.

In this example, the positive electrode tap may be welded to a cap plate for the can 11 or bent toward the outer circumference side of the electrode assembly 12 and welded to the can 11.

Thus, according to embodiments of the present invention, a positive electrode tap can be coupled to the electrode assembly at a short side portion of the electrode assembly, when the electrode assembly is received in the can. Because the spacing between the electrode assembly and the long side portion of the can is 0.35 mm±0.1 mm, while the spacing between the electrode assembly and the short side portion of the can is 0.5 mm±0.1 mm, the short side placement of the positive electrode tap prevents the positive electrode tap from being compressed against the corresponding electrode plate. That is, in an embodiment of the present invention, by positioning the positive electrode tap at the short side portion of the can where the spacing between the electrode assembly and the can is larger, the pressure of the positive electrode tap against the corresponding electrode plate of the electrode assembly can be largely reduced. Therefore, since the deformation of the corresponding electrode plate of the electrode assembly where the positive electrode tap is positioned can be prevented, increases in a thickness due to extraction of lithium ion and decreases in a capacity of the battery can be considerably suppressed.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope should be construed as being included in the present invention.

What is claimed is:

1. A secondary battery, comprising:
a can having a polygonal cross-section, an opening, two opposing main walls, and two opposing side walls that extend between edges of the main walls, the main walls having a larger surface area than the side walls;
an electrode assembly in the can, comprising a first electrode plate, a separator, and a second electrode plate, which are wound into a jellyroll shape, the electrode assembly having a central flat portion adjacent to the main walls and first and second curved portions on opposing sides of the flat portion, adjacent to the side walls of the can, such that the side walls are each positioned closer to respective ones of the first and second curved portions than to the flat portion;

a first electrode tap directly connected to the first electrode plate, at the first curved portion, and extending from the first curved portion through the opening of the can, such that a full width of the first electrode tap extends along the adjacent side wall of the can to reduce the pressure of the first electrode tap against at least one of the electrode plates of the electrode assembly, wherein the first electrode plate comprises a strip-shaped aluminum current collector that is coated with a positive active material, and the first electrode tap is a positive electrode tap that is welded to an uncoated portion of the aluminum current collector; and a second electrode tap directly connected to the second electrode plate, at the central flat portion, and extending from the central portion through the opening of the can, wherein the second electrode plate comprises a copper current collector that is coated with a negative active material, and the second electrode tap is a negative electrode tap that is welded to an uncoated portion of the copper current collector, wherein the first and second electrode taps extend in generally orthogonal planes.

2. The secondary battery of claim 1, wherein the width of the first electrode tap is smaller than the width of the adjacent side wall of the can.

3. The secondary battery of claim 1, wherein the distance, between the electrode assembly and the side walls of the can, is greater than the distance between the electrode assembly and the main walls of the can.

4. The secondary battery of claim 3, wherein the minimum distance between the electrode assembly and the side walls of the can is 0.5 mm±0.1 mm.

5. The secondary battery of claim 4, wherein the distance between the electrode assembly and the main walls of the can is 0.35mm±0.1mm.

6. The secondary battery of claim 1, wherein the first electrode tap is further welded to a cap plate of the can, or the first electrode tap is bent and welded to the outer surface of the can.

7. The secondary battery of claim 1, wherein the first electrode tap is centered along the adjacent side wall of the can.

8. A secondary battery comprising:

a can having a polygonal cross-section, an opening, two opposing main walls, and two opposing side walls that extend between edges of the main walls, the main walls having a larger surface area than the side walls;

an electrode assembly in the can, comprising a first electrode plate, a separator, and a second electrode plate, which are wound into a jellyroll shape, the electrode assembly having a central flat portion adjacent to the main walls and being spaced apart from the main walls by a first distance, and first and second curved portions on opposing sides of the flat portion, adjacent to the side walls of the can, such that the side walls are each positioned closer to respective ones of the first and second curved portions than to the flat portion;

a first electrode tap directly connected to the first electrode plate and extending through the opening of the can, the first electrode tap positioned between the electrode assembly and the can in a region in which a spacing or distance between the electrode assembly and a corresponding adjacent wall of the can is greater than the first distance, wherein the first electrode plate comprises a strip-shaped aluminum current collector that is coated with a positive active material, and the first electrode tap is a positive electrode tap that is welded to an uncoated portion of the aluminum current collector; and a second electrode tap directly connected to the second electrode plate, at the central flat portion, and extending from the central portion through the opening of the can, wherein the second electrode plate comprises a copper current collector that is coated with a negative active material, and the second electrode tap is a negative electrode tap that is welded to an uncoated portion of the copper current collector.

9. The secondary battery of claim 8, wherein a second distance between one of the first or second curved portions and the corresponding adjacent side wall of the can is greater than the first distance, and wherein the first electrode tap is directly connected to and extends from the first electrode plate at the one of the first or second curved portions.

* * * * *